E. P. HALL.
Window-Cleaning Device.
No. 200,611.  Patented Feb. 26, 1878.
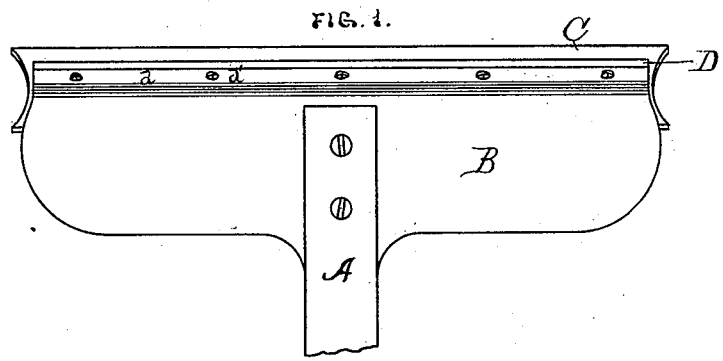
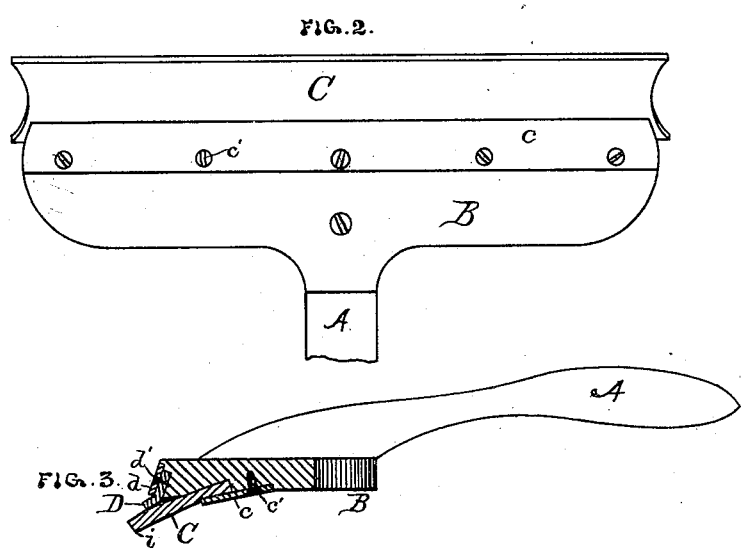
WITNESSES:
Forde R. Smith
Raymond Bliss
INVENTOR:
Elias Palmer Hall
by Munday & Evarts
Attys

UNITED STATES PATENT OFFICE.

ELIAS P. HALL, OF CHICAGO, ILLINOIS.

IMPROVEMENT IN WINDOW-CLEANING DEVICES.

Specification forming part of Letters Patent No. 200,611, dated February 26, 1878; application filed January 14, 1878.

*To all whom it may concern:*

Be it known that I, ELIAS PALMER HALL, of Chicago, in the county of Cook and State of Illinois, have invented certain Improvements in Devices for Cleaning Windows, of which the following is a specification:

The accompanying drawing shows, at Figure 1, a back view, and at Fig. 2, an under view, of my improved device. Fig. 3 is a cross-section thereof.

Like letters indicate like parts in all the figures in which they are used.

My device consists of certain parts constructed and arranged as hereinafter particularly set forth.

It is provided with a handle, A, secured centrally upon a wooden or other suitable piece, B, to which the cleansing parts are attached. This piece B is preferably thicker at the front than at the rear, to give greater strength at the point where the cleaning parts are secured, and where the greatest strain will be exerted upon it in use. Its under side is rabbeted with an inclined rabbet to receive a straight-edged rubber strip, C, which is secured by a flat metal strip, $c$, and screws $c'$, passed through the metal into the wood piece B. This metal strip compresses the rubber with sufficient firmness to hold it in place under all the conditions and uses to which the device is intended to be applied.

As will be observed by the drawing, the ends of the rubber strip are cut concave, and the corners thereof project somewhat beyond the rigid parts of the apparatus. My object in giving the rubber these two features are the following: By the projecting corners, especially those of the form shown, the cleaning of angles in the windows is much facilitated, as they enter all such parts of the windows, where, perhaps, the device as a whole could not be used. They are also useful in passing over those parts of the glass immediately adjoining the frames, as will be obvious. By hollowing out the ends, the corners are made pointed, and therefore more flexible than they would be were the ends square.

The longitudinal corner of the rubber, lettered $i$ in Fig. 3, is the part which comes against the glass in use, and it should preferably be a sharp right-angled corner.

My construction permits the rubber to be reversed, both as to sides and as to edges, by simply loosening the screws $c'$, and the rubbing-edge can, therefore, be renewed from time to time by simply turning the strip over, three renewals being thus permitted.

At the back of the rubber strip B is a reenforcing or stiffening strip, also of rubber, lettered D. This latter strip is secured by a flat metal piece, $d$, and screws $d'$, passing through both rubber and metal into the wood piece B, at the front edge of the latter. That part of the wood lying between the two pieces of rubber forms an acute angle, as shown.

I am aware that a patent has been granted wherein a cushion is interposed between the rubbing or cleaning strip and the projecting edge of the wood holder, such cushion consisting of a rubber tube; but such construction I do not claim.

The device I have described is equally effective, and is simpler and cheaper in construction.

I claim as my invention—

1. An improved device for cleaning windows, consisting of a handle, A, the piece B, the sharp-edged rubber strip C, secured to the under side of the piece B, and a rubber stiffening-strip of flat material, D, secured to the front edge of the piece B, all being constructed and arranged as described.

2. The combination, with the holding parts of the device, of a reversible rubbing-strip, of flat rubber, cut concave at the ends, as shown.

ELIAS PALMER HALL.

Witnesses:
    EDW. S. EVARTS,
    JOHN W. MUNDAY.